US012600842B2

(12) United States Patent (10) Patent No.: US 12,600,842 B2
Giannini et al. (45) Date of Patent: Apr. 14, 2026

(54) TYRE AND ELASTOMERIC COMPOUND FOR TYRE, COMPRISING CROSS-LINKED PHENOLIC RESINS

(71) Applicant: Pirelli Tyre S.p.A., Milan (IT)

(72) Inventors: Luca Giannini, Milan (IT); Luciano Tadiello, Milan (IT); Maria Rosaria Acocella, Fisciano (IT); Mario Maggio, Fisciano (IT); Gaetano Guerra, Fisciano (IT); Aniello Vittore, Fisciano (IT)

(73) Assignee: PIRELLI TYRE S.p.A., Milan (IT)

( * ) Notice: Subject to any disclaimer, the term of this patent is extended or adjusted under 35 U.S.C. 154(b) by 169 days.

(21) Appl. No.: 17/311,112

(22) PCT Filed: Dec. 10, 2019

(86) PCT No.: PCT/IB2019/060596
§ 371 (c)(1),
(2) Date: Jun. 4, 2021

(87) PCT Pub. No.: WO2020/121180
PCT Pub. Date: Jun. 18, 2020

(65) Prior Publication Data
US 2022/0025159 A1 Jan. 27, 2022

(30) Foreign Application Priority Data
Dec. 11, 2018 (IT) ........................ 102018000010983

(51) Int. Cl.
B60C 1/00 (2006.01)
C08K 3/013 (2018.01)
(Continued)

(52) U.S. Cl.
CPC .............. C08L 9/00 (2013.01); B60C 1/0016 (2013.01); B60C 1/0025 (2013.01);
(Continued)

(58) Field of Classification Search
CPC ....... B60C 1/00; B60C 1/0016; B60C 1/0025; C08K 3/04
See application file for complete search history.

(56) References Cited

U.S. PATENT DOCUMENTS 8,779,031 B2 7/2014 Schachtely et al.
9,422,413 B1 8/2016 Bosnyak et al.
(Continued)

FOREIGN PATENT DOCUMENTS

CN 101240119 B 5/2011
EP 0846718 * 6/1998
(Continued)

OTHER PUBLICATIONS

Office Action dated Apr. 7, 2023, from the Federal Service for Intellectual Property, in counterpart Russian Application No. 2021119205.

(Continued)

*Primary Examiner* — Justin R Fischer
(74) *Attorney, Agent, or Firm* — Finnegan, Henderson, Farabow, Garrett & Dunner, L.L.P.

(57) ABSTRACT

The present invention relates to elastomeric compositions for tyres and relative compounds, components and tyres comprising them, said compositions comprising an elastomeric polymer, a phenolic product, optionally already partially cross-linked, optionally an aldehyde and/or at least a methylene donor product and an oxidised carbon allotrope as a cross-linking catalyst. Advantageously, this catalyst is able to complete the cross-linking reactions of the phenolic resins in the conventional times and conditions of vulcanisation, or even more rapidly, providing mechanically stable compounds.

20 Claims, 6 Drawing Sheets

(51) Int. Cl.

| | |
|---|---|
| *C08K 3/04* | (2006.01) |
| *C08K 5/00* | (2006.01) |
| *C08K 5/13* | (2006.01) |
| *C08K 13/02* | (2006.01) |
| *C08L 9/00* | (2006.01) |

(52) U.S. Cl.
CPC ............ *B60C 1/0041* (2013.01); *C08K 3/013* (2018.01); *C08K 3/04* (2013.01); *C08K 3/041* (2017.05); *C08K 3/042* (2017.05); *C08K 5/0025* (2013.01); *C08K 5/13* (2013.01); *C08K 13/02* (2013.01); *B60C 2001/0033* (2013.01); *B60C 2001/005* (2013.01)

(56) References Cited

U.S. PATENT DOCUMENTS

| | | | | |
|---|---|---|---|---|
| 9,493,626 | B1 | 11/2016 | Bosnyak et al. | |
| 2003/0212185 | A1* | 11/2003 | Vasseur ..................... | C08L 9/06 524/492 |
| 2007/0161756 | A1 | 7/2007 | Fukushima et al. | |
| 2012/0083562 | A1 | 4/2012 | Fukushima et al. | |
| 2013/0261221 | A1 | 10/2013 | Bosnyak et al. | |
| 2013/0281612 | A1 | 10/2013 | Bosnyak et al. | |
| 2016/0108202 | A1 | 4/2016 | Bosnyak et al. | |
| 2017/0050158 | A1 | 2/2017 | Bosnyak et al. | |
| 2019/0002702 | A1* | 1/2019 | Herd ........................ | C09C 3/08 |

FOREIGN PATENT DOCUMENTS

| | | | | | |
|---|---|---|---|---|---|
| EP | 846718 | A1 | 6/1998 | | |
| EP | 0 649 446 | B1 | 12/1999 | | |
| EP | 1 803 713 | A2 | 7/2007 | | |
| EP | 2 418 243 | B1 | 5/2016 | | |
| JP | 2018-100334 | * | 6/2018 | | |
| KR | 2003-0020424 | * | 3/2003 | | |
| RU | 2173326 | C2 | 9/2001 | | |
| RU | 2668980 | C1 | 10/2018 | | |
| RU | 2673284 | C1 | 11/2018 | | |
| WO | WO-9632437 | A1 | * | 10/1996 | ................ C08J 3/24 |
| WO | WO 2012/080158 | A1 | 6/2012 | | |

OTHER PUBLICATIONS

International Search Report form the European Patent Office in corresponding International Application No. PCT/IB2019/060596 mailed May 7, 2020.

Written Opinion of the International Searching Authority from the European Patent Office in corresponding International Application No. PCT/IB2019/060596 mailed May 7, 2020.

Acocella, M.R., et al., "Graphene Oxide and Oxidized Carbon Black as Catalyst for Crosslinking of Phenolic Rensins" Polymers 2019, vol. 11, No. 1330, Aug. 10, 2019, (11 pages).

\* cited by examiner

Es. 6A (no cat. Ref)

Es. 6B (GO, Inv)

Es. 6C (o-N110, Inv)

1

TYRE AND ELASTOMERIC COMPOUND FOR TYRE, COMPRISING CROSS-LINKED PHENOLIC RESINS

This application is a national stage filing under 35 U.S.C. § 371 of International Application No. PCT/IB2019/060596, filed on Dec. 10, 2019, which claims the benefit of priority to Italian Priority application No. 102018000010983, filed Dec. 11, 2018; the disclosure of each of these applications are each incorporated herein by reference in their entirety.

FIELD OF THE INVENTION

The present invention relates to tyres for vehicle wheels, elastomeric compounds for said tyres comprising phenolic resins and the preparation thereof.

PRIOR ART

In the production of tyres, phenolic resins—obtained by reaction between phenol and formaldehyde, or analogues thereof such as resorcin and methylene donor products, such as hexamethoxymethylmelamine (EMMM)—are used as secondary cross-linking systems in elastomeric compounds that require a higher elastic modulus, generally not reachable with sulphur vulcanisation alone.

In this regard, for example, patents EP2418243B1 and EP0649446B1 describe the use of these resins in elastomeric compounds intended for filling the bead, a component of the tyre typically of high rigidity since it is particularly subject to mechanical stress.

The kinetics of the cross-linking reaction of these systems, favoured by heating and catalysis, however, is slower than that of sulphur cross-linking which occurs in vulcanisation. Therefore, when in the production of tyres the elastomeric material is subjected to vulcanisation, it becomes difficult to reconcile this different reactivity. In fact, at the end of normal vulcanisation, the material typically does not have stable mechanical properties, as evidenced by the increasing elastic modulus (the so-called marching modulus), due to the prolongation of the secondary cross-linking reactions.

Various studies on cross-linking reactions and possible catalysis systems thereof are known in the literature.

For example, in the article "*Effects of graphene oxides on the cure behaviors of a tetrafunctional epoxy resin*" Qiu et al. Express Polymer Letters 2011 vol. 5 page 809, the kinetics of some polymerisation reactions were studied. In particular, it was shown that oxidised graphene could exhibit a certain catalytic activity against the cross-linking of epoxy resins.

These studies, however, concerned simple systems in which the resin constituted the main polymer, certainly not comparable to the cross-linking that occurs inside elastomeric compounds for tyres, where the reagents are found in very low concentrations, dispersed in the elastomer and in the presence of other reactive species, such as for example sulphur, and form a secondary polymeric lattice interpenetrated in the prevailing sulphur cross-linked elastomeric matrix.

These studies suggested nothing about the possible catalytic activity of oxidised graphene on the reactivity of phenolic resins in elastomeric compounds and under vulcanisation conditions.

Among other things, the incorporation of oxidised carbon species in elastomeric compounds was discouraged because it was known that carbon black slowed the kinetics of sulphur vulcanisation of rubber due to the presence of oxidised surface species originated by the action of oxygen on the carbon (Schonefield, Industrial and engineering chemistry 1934, page 571, vol. 27, no. 5).

EP1803713A2 relates to compositions for coupling polymers and reinforcing fillers, and polymeric compositions comprising such coupling compositions.

WO2012/080158 relates to compositions and methods for producing mixtures of elastomeric composite and elastomeric materials with carbon nanotubes.

Neither EP1803713A2 nor WO2012/080158 describe or suggest the combined use of an oxidised carbon allotrope and a phenolic product as secondary cross-linking systems in elastomeric compounds.

SUMMARY OF THE INVENTION

The Applicant has dealt with the problem of how to accelerate the secondary cross-linking reactions in elastomeric compounds for tyres, possibly without depressing the sulphur vulcanisation reaction, in order to obtain elastomeric compounds with stable mechanical properties.

In light of the general knowledge and relevant literature of the sector discussed above, however, these objects seemed difficult to achieve.

On the other hand, the Applicant has surprisingly found that some oxidised carbon allotropes, in particular oxidised carbon black, and especially oxidised carbon black with a large surface area, are able to complete the cross-linking reactions of phenolic resins in of elastomeric compounds for tyres, in conventional times and conditions of vulcanisation, or even more rapidly, providing mechanically stable compounds.

Therefore, a first aspect of the present invention is an elastomeric composition for tyres comprising at least:

- 100 phr of at least one diene elastomeric polymer (A),
- 0.5 to 50 phr of at least one phenolic product (B), optionally already partially cross-linked,
- 0.5 to 100 phr of at least one oxidised carbon allotrope (C) selected from oxidised carbon nanotubes, oxidised graphite, oxidised graphene and oxidised carbon black,
- 0 to 50 phr of at least one aldehyde and/or at least one methylene donor product (D),
- 0 to 120 phr of at least one reinforcing filler (E), and
- 0.1 to 15 phr of at least one vulcanising agent (F).

A further aspect of the present invention is a vulcanisable elastomeric compound for tyres obtained by mixing and possibly heating the components of the elastomeric composition for tyres of the invention.

A further aspect of the present invention is a process for preparing the vulcanisable elastomeric compound of the invention which comprises:

I) working and optionally heating to a temperature not higher than 160° C. in at least one suitable mixer:
- at least one elastomeric polymer (A),
- optionally at least one phenolic product (B), optionally already partially cross-linked, optionally at least one oxidised carbon allotrope (C) selected from oxidised carbon nanotubes, oxidised graphite, oxidised graphene and oxidised carbon black and, optionally, at least one reinforcing filler (E),
- to yield a non-vulcanisable elastomeric compound (m1);
II) incorporating into the non-vulcanisable elastomeric compound (m1):
- at least one vulcanisation agent (F) and, if present, at least one aldehyde and/or at least one methylene donor product (D), optionally, at least one vulcanisation accelerant and/or retardant agent, optionally at least one phenolic product (B), optionally already partially cross-linked, optionally at least one oxidised carbon allotrope (C) selected from oxidised carbon nanotubes, oxidised graphite, oxidised graphene and oxidised carbon black, provided that said at least one oxidised carbon allotrope (C) and said at least one phenolic product (B), possibly already partially cross-linked, are present in at least one of the steps I) or II), and working the compound, in the same or another suitable mixer, at a temperature not higher than 120° C., to yield a vulcanisable elastomeric compound (m2), and III) discharging the vulcanisable elastomeric compound (m2).

A further aspect of the present invention is a component of a tyre comprising the vulcanisable compound of the invention or the vulcanised compound obtained by vulcanisation thereof.

A further aspect of the present invention is a tyre for vehicle wheels comprising at least one component of a tyre according to the invention.

A further aspect of the present invention is the use of at least one oxidised carbon allotrope (C) selected from oxidised carbon nanotubes, oxidised graphite, oxidised graphene and oxidised carbon black as cross-linking accelerant of at least one phenolic product (B), optionally already partially cross-linked, and preferably at least an aldehyde and/or at least one methylene donor product (D), in a vulcanisable elastomeric compound for tyres.

Definitions

Unless otherwise indicated, all the percentages are expressed as percentages by weight.

The term "phenolic resins" means the synthetic polymers obtainable by reaction of at least one phenolic product with at least one aldehyde, preferably formaldehyde, or with precursors thereof that release formaldehyde, in any stoichiometric ratio and, possibly, with any type of catalysis both acidic and basic.

Examples of phenolic resins are novolacs, obtained with an aldehyde:phenolic product molar ratio of less than one, in acidic conditions, the cross-linking whereof can be completed in the presence of further aldehyde and resolic resins, prepared with aldehyde:phenol molar ratios higher than one, in basic conditions and which can further cross-link even by heating only.

The term "phenolic product" refers to a hydroxylated aromatic product such as phenol and mono- or poly-hydroxylated, mono- or polycyclic analogues thereof, possibly mono- or polysubstituted.

The term "already partially cross-linked phenolic product" means a phenolic product which may have already partially reacted at least with an aldehyde, preferably formaldehyde, but which is still susceptible to further cross-linking.

The term "methylene donor product (D)" means a product capable of releasing formaldehyde in situ during the processing of the present elastomeric composition.

The term "carbon allotropes" generally refers to the polymorphic forms of carbon.

Preferred carbon allotropes herein are the polymorphic forms of carbon in which the carbon is predominantly in the $sp_2$ configuration. Examples of carbon allotropes are carbon black, graphite, graphene, fullerene and carbon nanotubes.

The term "carbon black" refers to a nanostructured carbon allotrope consisting of aggregates of spherical particles consisting of polycrystalline graphite.

The term "graphite" refers to the carbon allotrope characterised by a lamellar structure consisting of planar layers of $sp_2$ carbon atoms forming a hexagonal mesh lattice.

The term "graphene" preferably indicates a single layer of carbon atoms with a $sp_2$ configuration forming a hexagonal mesh lattice.

However, the term "graphene" may also comprise "graphene nanoplatelets", "nanographite" and "few layers graphene", that is, products with a number of superimposed intermediate layers of carbon atoms between the single-layer graphene and the graphite, all characterised by nanometric dimensions (i.e. having at least one dimension less than 100 nm).

The term "expanded graphite" means a graphite prepared by treating natural graphite, for example with chromic acid and concentrated sulphuric acid. Under these conditions, graphite expands due to the chemical reactions that take place at the interface between the planes.

The term "carbon nanotubes" means a carbon allotrope in which one or more superimposed sheets of graphite fold up to form an empty cylindrical structure.

The term "oxidised carbon allotropes" refers to the carbon allotropes which have undergone an oxidation reaction, for example such as that described in the present experimental part. In particular, oxidised carbon allotropes are those oxidised allotropes which have an oxygen/carbon ratio of at least 0.20.

By the expression "rubber", "elastomeric polymer" or "elastomer" it is meant a natural or synthetic polymer which, after vulcanisation, at room temperature can be stretched repeatedly to at least twice its original length and which, after removal of the tensile load substantially immediately returns with force to approximately its original length (according to the definitions of the ASTM D1566-11 Standard terminology relating to Rubber).

The term "elastomeric composition for tyres" means a composition comprising at least one diene elastomeric polymer and one or more additives, which by mixing and possible heating provides an elastomeric compound suitable for use in tyre components.

The components of the elastomeric composition are not generally all introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable or vulcanised elastomeric compound, the individual components of the elastomeric composition do not always remain unchanged or are individually traceable as they may have been transformed, completely or in part, due to the interaction with other components, of heat and/or mechanical processing. The term "elastomeric composition" herein is meant to include the set of all the components that are added in the preparation of the elastomeric compound, regardless of whether they are all actually present simultaneously, are introduced sequentially or are then traceable in the elastomeric compound or in the final tyre.

The term "elastomeric compound" indicates a compound obtainable by processing at least one elastomeric polymer with at least one of the additives commonly used in the preparation of tyre compounds.

The term "non-vulcanisable elastomeric compound" means a compound obtainable by processing at least one elastomeric polymer with at least one of the additives commonly used in the preparation of tyre compounds, with the exception of vulcanising agents.

The term "vulcanisable elastomeric compound" indicates an elastomeric compound ready for vulcanisation, obtainable by incorporation into a non-vulcanisable elastomeric compound of all the additives, including those of vulcanisation.

The term "vulcanised elastomeric compound" means the material obtainable by vulcanisation of a vulcanisable elastomeric compound.

The term green is generally used to indicate a material, a compound, a composition, a component or a tyre not yet vulcanised.

DETAILED DESCRIPTION OF THE INVENTION

According to a first aspect, the present invention relates to an elastomeric composition for tyres.

The elastomeric composition for tyres according to the present invention is characterised by one or more of the following preferred aspects taken alone or in combination with one another.

The elastomeric composition for tyres according to the invention comprises at least 100 phr of at least one diene elastomeric polymer (A).

The diene elastomeric polymer (A) used in the present process may be selected from those commonly used in sulphur-vulcanisable elastomeric compositions, which are particularly suitable for producing tyres, i.e. from among elastomeric polymers or copolymers with an unsaturated chain having a glass transition temperature (Tg) generally lower than 20° C., preferably in the range from 0° C. to −110° C.

The diene elastomeric polymer may have a weight average molecular weight (Mw) higher than 80000 g/mol.

Optionally, the diene elastomeric polymer may also comprise diene polymers with a lower molecular weight, for example liquid polymers such as LIR50 with an average molecular weight of around 50000 g/mol.

These polymers or copolymers may be of natural origin or may be obtained by solution polymerization, emulsion polymerization or gas-phase polymerization of one or more conjugated diolefins, optionally mixed with at least one comonomer selected from monovinylarenes and/or polar comonomers in an amount not exceeding 60% by weight.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-m methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer (A) which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

The present elastomeric composition may possibly comprise an elastomeric polymer of one or more monoolefins with an olefinic comonomer or derivatives thereof (A). The monoolefins can be selected from: ethylene and α-olefins generally containing from 3 to 12 carbon atoms, such as for example propylene, 1-butene, 1-pentene, 1-hexene, 1-octene and mixtures thereof. The following are preferred: copolymers selected from ethylene and an α-olefin, optionally with a diene;

isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene and mixtures thereof.

Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

A diene elastomeric polymer (A) or an elastomeric polymer (A') functionalized by reaction with suitable terminating agents or coupling agents may also be used. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

In the present description, the term at least one elastomeric polymer (A) means that one or more diene elastomeric polymers (A) as defined above may be present in a mixture.

In the present composition, the quantity of the at least one elastomeric polymer (A) or the mixture of two or more elastomeric polymers (A) as defined above amounts to a total of 100 phr.

The elastomeric composition for tyres according to the invention comprises from 0.5 to 50 phr of at least one phenolic product (B), optionally already partially cross-linked.

Preferably the elastomeric composition for tyres according to the invention comprises from 1 to 30 phr, more preferably from 3 to 20 phr of at least one phenolic product (B).

In the present description, the term at least one phenolic product (B) means that one or more phenolic products (B)

may be present in a mixture. In the case of mixtures, the phenolic products (B) are present overall in the preferred quantities indicated above.

Preferably, the at least one phenolic product (B) is selected from phenol, ethylphenols such as o-ethylphenol, m-ethylphenol, p-ethylphenol, and the like; isopropylphenols; butylphenols such as butylphenol, p-tert-butylphenol, and the like; alkylphenols such as p-tert-amylphenol, p-octylphenol, p-nonylphenol, p-cumylphenol, and the like; halogenophenols such as fluorophenol, chlorophenol, bromophenol, iodophenol, and the like; substituted monophenols such as p-phenylphenol, aminophenol, nitrophenol, dinitrophenol, trinitrophenol, and the like; cresols such as o-cresol, m-cresol, p-cresol, xylenols such as 2,3-xylenol, 2,4-xylenol, 2,5-xylenol, 2,6-xylenol, 3,4-xylenol, 3,5-xylenol, and the like; bicyclic monophenols such as 1-naphthol, 2-naphthol, and the like; polyphenols such as resorcin, alkylresorcin—such as 2-methylresorcin, 5-methylresorcin, 2,5-dimethylresorcin, 4-ethylresorcin, 4-n-hexylresorcin and the like; 4-chlororesorcin, 2-nitroresorcin, 4-bromoresorcin and the like, pyrogallol, catechol, alkylcatechol, hydroquinone, alkylhydroquinone, fluoroglucine, bisphenol A, bisphenol F, bisphenol S, dihydroxynaphthalene and the like, novolacs and resoles.

More preferably, the at least one phenolic product (B) is selected from phenols, resorcins, cresols, catechols and novolacs, even more preferably from phenols and novolacs.

The at least one phenolic product (B) may already be partially cross-linked, preferably by reaction with at least one aldehyde, more preferably formaldehyde.

Preferably the at least one phenolic product (B) is already partially cross-linked, more preferably it is already partially cross-linked with formaldehyde.

Examples of phenolic products (B) already partially cross-linked are novolacs and resoles.

Commercial examples of partially cross-linked phenolic products (B) suitable for use in the present elastomeric composition are the Novolac ALNOVOL PN 320 resin from Allnex, the EPIKOTE 154 resin from Hexion, the HRJ-11995 resin from SI Group.

The elastomeric composition for tyres according to the invention comprises at least one oxidised carbon allotrope (C) selected from oxidised carbon nanotubes, oxidised graphite, oxidised graphene and oxidised carbon black.

Preferably, the oxidised carbon allotrope (C) is oxidised carbon black.

Preferably, the elastomeric composition for tyres according to the invention comprises from 1 to 50 phr, more preferably from 2 to 20 phr, even more preferably from 3 to 10 phr of oxidised carbon allotrope (C) selected from oxidised carbon nanotubes, oxidised graphite, oxidised graphene and oxidised carbon black, more preferably oxidised carbon black.

Preferably, the elastomeric composition for tyres according to the invention comprises the carbon allotrope (C) in a weight ratio with respect to the phenolic product (B) comprised between 0.1:1 and 2:1, more preferably between 0.2:1 and 1:1.

The elastomeric composition for tyres according to the invention may optionally comprise a mixture of two or more oxidised carbon allotropes (C), in an overall quantity preferably included in the above ranges.

The oxidised carbon allotrope (C) suitable for use in the present composition may be prepared by oxidation of the corresponding carbon allotrope, for example as described in the present experimental part (Example 1, Example 3) or in literature in the articles Green Chem. (2017), 19, page 900-904 and Corrosion Science 73 (2013), page 356-364.

The starting carbon allotrope, preferably the carbon black, suitable for the preparation of the oxidised allotrope (C) is preferably characterised by a surface area (BET measured according to ISO 9277:2010 of at least 80 $m^2/g$, more preferably of at least 105 $m^2/g$.

In the case of graphite, the starting material may also be an expanded graphite.

The starting carbon allotrope, suitable for the preparation of the oxidised allotrope (C), is preferably characterised by high roughness, measurable according to ISO 9277:2010.

Examples of commercial starting carbon black suitable for the preparation of the oxidised carbon black are grades N110, N115, N211, N121, N220 and N234 from Cabot.

An example of commercial starting graphite suitable for the preparation of the oxidised expanded graphite and oxidised graphene is the synthetic graphite TC 307 from Asbury.

An example of commercial nanotube carbon suitable for the preparation of oxidised nanotube carbon is MWCNT Nanocyl 7000 from Nanocyl.

The oxidised carbon allotrope (C), preferably oxidised carbon black, suitable for use in the present composition is preferably characterised by an oxygen content higher than 20%, more preferably higher than 30%, even more preferably higher than 34% measured by elemental analysis.

The oxidised carbon allotrope (C), preferably oxidised carbon black, suitable for use in the present composition, is characterised by an oxygen/carbon 0/C ratio at least equal to 0.20, preferably higher than 0.30, more preferably higher than 0.50, even more preferably higher than 0.60, even more preferably higher than 0.70, a ratio obtained from the elemental analysis data.

The oxidised carbon allotrope (C), preferably oxidised carbon black, suitable for use in the present composition, is preferably characterised by a surface area (BET measured according to ISO 9277:2010 of at least 20 $m^2/g$, more preferably of at least 40 $m^2/g$.

In a preferred embodiment, the oxidised carbon black suitable for use in the present composition is characterised by an O/C ratio higher than 0.50, preferably higher than 0.60, more preferably higher than 0.70 and by a surface area (BET) of at least 40 $m^2/g$.

The oxidised carbon allotrope (C), suitable for use in the present composition at the IR analysis, shows important signals characteristic of oxidised groups such as ethers, alcohols, ketones or carboxylic acids in the area from about 800 to 1700 $cm^{-1}$ (see FIG. 4). As can be seen from the diagram in FIG. 4, the signals are particularly intense for oxidised carbon black (o-N110 and o-N234) and in any case present for oxidised graphene and oxidised expanded graphite (GO and e-GO) while they are absent in non-oxidised reference products (HSAG graphite with high surface area and carbon black N110).

The elastomeric composition for tyres according to the invention may comprise at least one aldehyde and/or at least one methylene donor product (D).

Preferably, aldehyde is selected from formaldehyde, acetaldehyde, propionaldehyde, chloral, furfural, glyoxal, n-butylaldehyde, caproaldehyde, allylaldehyde, benzaldehyde, crotonaldehyde, acrolein, phenylacetaldehyde, o-tolylaldehyde, salicylaldehyde, more preferably it is formaldehyde.

In a preferred embodiment, the elastomeric composition for tyres according to the invention comprises at least one methylene donor product, more preferably it does not comprise any aldehyde but only at least one methylene donor product.

Preferably, the at least one methylene donor product is selected from paraformaldehyde, trioxane, tetraymethylene, hexamethylenetetramine (EMTA), hexamethoxymethylmelamine (EMMM), more preferably it is EMMM.

Commercial examples of suitable methylene donor products (D) are EMMM Cyrez 964 P.C. from Cytec and EMTA FlexaTram-HMT-100 from Ascend.

Preferably the elastomeric composition for tyres of the invention comprises from 1 to 8 phr, more preferably from 2 to 6 phr of at least one aldehyde and/or at least one methylene donor product (D).

In the case of mixtures, the aldehyde and one or more methylene donor products (D) are present overall in the preferred quantities indicated above.

More preferably, the elastomeric composition for tyres according to the invention comprises from 1 to 8 phr, more preferably from 2 to 6 phr of at least one methylene donor product (D) and does not comprise any aldehyde.

The man skilled in the art will select the suitable amount of aldehyde and/or methylene donor product (D) to be used, taking into account, for example, the degree of cross-linking already present, the desired final cross-linking degree, the presence of other components that more or less disperse reactive components and the like.

Preferably, the weight ratio between the at least one phenolic product (B), optionally already partially cross-linked, and the aldehyde and/or the at least one methylene donor compound (D) is comprised between 0.1:1 and 60:1, more preferably between 0.5:1 and 20:1, even more preferably between 1:1 and 8:1.

The elastomeric composition for tyres according to the invention may optionally comprise at least one reinforcing filler (E) selected from carbon black, conventional silica, such as sand silica precipitated with strong acids, preferably amorphous, diatomaceous earth, calcium carbonate, titanium dioxide, talc, alumina, aluminosilicates, kaolin, silicate fibers and mixtures thereof.

Preferably, the reinforcing filler (E) is selected from carbon black, conventional silica, silicate fibres and mixtures thereof.

The reinforcing filler (E) may be present in the elastomeric compound in an amount generally from 0 phr to 120 phr, preferably from 3 phr to 90 phr.

In one embodiment, the reinforcing filler (E) may be absent, in which case the reinforcing function may be completely performed by the oxidised carbon allotrope.

In this case, the oxidised carbon allotrope (C) is preferably used in quantities of 0.5 to 100 phr, more preferably between 1 and 80 phr.

In one embodiment, the reinforcing function may be performed in part by the at least one oxidised carbon allotrope (C) and in part by the at least one reinforcing filler (E).

The elastomeric composition for tyres of the invention may optionally comprise one or more reinforcing fillers (E) as defined above in a mixture.

Commercial examples of reinforcing fillers (E) suitable for use in the present elastomeric composition are the carbon black N326 and N375 from Cabot, the carbon black N326 and N375 from Birla.

The elastomeric composition for tyres according to the invention comprises at least one vulcanising agent (F).

The at least one vulcanising agent (F) is preferably selected from sulphur, or alternatively, sulphur-containing molecules (sulphur donors), such as for example caprolactam disulphide (CLD), bis(trialcoxysilyl)propyl]polysulphides, dithiophosphates, phosphorylpolysulphide (SDT) and mixtures thereof.

Preferably, the vulcanising agent (F) is sulphur, preferably selected from soluble sulphur (crystalline sulphur), insoluble sulphur (polymeric sulphur), (iii) oil-dispersed sulphur and mixtures thereof.

Commercial examples of vulcanising agents (F) suitable for use in the elastomeric composition for tyres of the invention are 67% sulphur known by the commercial name of Crystex OT33 from Eastman and caprolactam disulphide 80% Rhenogran CLD 80 from Lanxess.

The vulcanising agent (F) may be present in the elastomeric composition of the invention in an overall amount generally of from 0.1 to 15 phr, preferably from 0.5 to 12 phr, even more preferably from 1 to 10 phr.

The present elastomeric composition may possibly comprise one or more vulcanising agents (F) as defined above in a mixture.

The elastomeric composition for tyres according to the invention may optionally comprise at least one compatibilising agent.

The term "compatibilising agent" means a product capable of interacting with the reinforcing filler, in particular with silica, and binding it to the diene elastomeric polymer during vulcanisation.

Preferably, the compatibilising agent suitable for use in the present composition is a silane selected from those having at least one hydrolyzable silane group, which may be identified, for example, by the following general formula (I):

$$(R)_3Si—C_nH_{2n}—X \qquad (I)$$

where the R groups, which may be the same or different, are selected from alkyl, alkoxy or aryloxy groups or from halogen atoms, provided that at least one of the R groups is an alkoxy or aryloxy group or a halogen; n is an integer of from 1 to 6, inclusive; X is a group selected from: nitrous, mercapto, amino, epoxide, vinyl, imide, chlorine, $—(S)_m$ $C_nH_{2n}—Si—(R)_3$ and $—S—COR$, where m and n are integers of from 1 to 6 inclusive and the R groups are as defined above.

Preferred compatibilising agents are bis(3-triethoxysilylpropyl)tetrasulphide (TESPT) and bis(3-triethoxyisilylpropyl)disulphide (TESPD).

Commercial examples of compatibilising agents suitable for use in the present elastomeric composition are bis(3-triethoxysylpropyl)tetrasulphide Si69 marketed by Evonik and Silane NXT from Momentive.

If present, the compatibilising agent is included in the elastomeric composition for tyres of the invention in a total quantity from 0.1 phr to 20 phr, preferably from 0.5 phr to 10 phr.

The present elastomeric composition may possibly comprise one or more compatibilising agents as defined above in a mixture.

The elastomeric composition for tyres according to the invention may optionally comprise at least one antioxidant agent.

The antioxidant agent is preferably selected from N-isopropyl-N'-phenyl-p-phenylenediamine (IPPD), N+1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like and mixtures thereof, preferably it is N-1,3-dimethylbutyl-N-phenyl-p-phenylenediamine (6-PPD).

A commercial example of a suitable antioxidant agent is 6PPD from Solutia/Eastman or Santoflex produced by Flexsys.

The antioxidant agent may be present in the elastomeric composition in an overall amount generally from 0 phr to 20 phr, preferably from 0.5 phr to 10 phr. The elastomeric composition for tyres according to the invention may optionally comprise at least one wax.

The wax may be for example a petroleum wax or a mixture of paraffins.

Commercial examples of suitable waxes are the Repsol N-paraffin mixture and the Antilux® 654 microcrystalline wax from Rhein Chemie.

The wax may be present in the elastomeric composition of the invention in an overall amount generally from 0.1 phr to 20 phr, preferably from 0.5 phr to 5 phr. The elastomeric composition for tyres according to the invention may optionally comprise one or more vulcanisation additives, such as activators, accelerants and retardants.

The elastomeric composition for tyres according to the invention may optionally comprise at least one vulcanisation activator.

The vulcanisation activators suitable for use in the present elastomeric composition are zinc compounds, in particular ZnO, ZnCO$_3$, zinc salts of saturated or unsaturated fatty acids containing from 8 to 18 carbon atoms, such as, for example, zinc stearate, which are preferably formed in situ in the elastomeric composition by reaction of ZnO and of the fatty acid, as well as Bi$_2$O$_3$, PbO, Pb$_3$O$_4$, PbO$_2$, or mixtures thereof.

Preferably, the vulcanisation activator agents are present in the elastomeric composition for tyres of the invention in amounts from 0.2 to 15 phr, preferably from 0.5 to 10 phr.

Preferred activator agents derive from the reaction of zinc oxide and stearic acid.

The elastomeric composition for tyres according to the invention may optionally comprise at least one vulcanisation accelerant.

The vulcanisation accelerant agent is preferably selected from dithiocarbamates, guanidines, thioureas, thiazoles, sulphenamides, thiurams, amines, xanthates and mixtures thereof.

Preferably, the accelerant agent is selected from N-cyclohexyl-2-benzothiazol-sulphenamide (CBS), N-tert-butyl-2-benzothiazol-sulphenamide (TBBS) and mixtures thereof.

Commercial examples of vulcanisation accelerants suitable for use in the present elastomeric composition for tyres are N-cyclohexyl-2-benzothiazyl-sulphenamide Vulkacit® (CBS or CZ), N-terbutyl 2-benzothiazil sulphenamide, Vulkacit® NZ/EGC marketed by Lanxess.

The vulcanisation accelerant agent may be present in the present elastomeric composition for tyres in an overall amount generally from 0.05 phr to 10 phr, preferably from 0.1 phr to 5 phr.

The present elastomeric composition may comprise one or more accelerant agents as defined above in a mixture.

The elastomeric composition for tyres according to the invention may optionally comprise at least one vulcanisation retardant.

The vulcanisation retardant agent suitable for use in the present elastomeric composition for tyres is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present elastomeric composition in an amount of generally from 0.05 phr to 2 phr.

The present elastomeric composition may comprise one or more vulcanisation retardant agents as defined above in a mixture.

The present elastomeric composition for tyres may possibly comprise other additives commonly used in the production of tyre compounds, selected on the basis of the specific application for which the composition is intended. For example, the following may be added: anti-ageing agents, plasticisers, adhesives, anti-ozone agents, modifying resins, or mixtures thereof.

In particular, in order to further improve the processability of the compound, the composition may optionally be admixed with at least one plasticiser generally selected from mineral oils, vegetable oils, synthetic oils, polymers with a low molecular weight and mixtures thereof, such as, for example, aromatic oil, naphthenic oil, phthalates, soybean oil and mixtures thereof.

The amount of plasticiser is preferably from 0.1 phr to 70 phr, preferably from 5 phr to 30 phr.

In a preferred embodiment, the present elastomeric composition for tyres, preferably for bead filling, comprises at least 100 phr of at least one diene elastomeric polymer (A),
5 to 25 phr of a novolac (B),
2 to 6 phr of oxidised carbon black (C),
3 to 8 phr of a methylene donor product (D),
30 to 70 phr of carbon black (E), and
6 to 10 phr of sulphur (F).

A further aspect of the present invention is a vulcanisable elastomeric compound for tyres obtained by mixing and possibly heating the components of the elastomeric composition for tyres of the invention.

The elastomeric compound of the invention may be prepared by mixing together and, optionally, by suitably heating the components of the composition according to techniques known in the art.

Preferably, the process for the preparation of the vulcanisable elastomeric compound of the invention comprises:

I) working and optionally heating to a temperature comprised between 130 and 160° C., in at least one suitable mixer:
at least one elastomeric polymer (A),
optionally at least one phenolic product (B), optionally already partially cross-linked,
optionally at least one oxidised carbon allotrope (C) selected from oxidised carbon nanotubes, oxidised graphite, oxidised graphene and oxidised carbon black and,
optionally, at least one reinforcing filler (E),
to yield a non-vulcanisable elastomeric compound (m1);
II) incorporating into the non-vulcanisable elastomeric compound (m1).
at least one vulcanisation agent (F) and, if present, at least one aldehyde and/or at least one methylene donor product (D),
optionally, at least one vulcanisation accelerant and/or retardant agent, optionally at least one phenolic product (B), optionally already partially cross-linked, optionally at least one oxidised carbon allotrope (C) selected from oxidised carbon nanotubes, oxidised graphite, oxidised graphene and oxidised carbon black, provided that said at least one oxidised carbon allotrope (C) and said at least one phenolic product (B), possibly already partially cross-linked, are present in at least one of the steps I) or H), and working the compound, in the same or another suitable mixer, at a temperature preferably not higher than 120° C., more preferably not higher than 105° C., to yield a vulcanisable elastomeric compound (m2), and III) discharging the vulcanisable elastomeric compound (m2).

The processing of the components (step I) may take place in one or more stages, during which the other optional components described above can be added, but preferably not the vulcanisation additives (non-productive step).

The processing of the components may be performed in one or more suitable mixers, for example in an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

The processing may be discontinuous, i.e. in batches, or continuous, with the simultaneous or, preferably, sequential addition of the components.

In the case of batch processes, the processing may be carried out in one or, preferably, in several stages, carried out in the same or in different mixers, at the end of which the compound is generally discharged.

In the case of continuous processes, carried out for example in planetary mixers, twin-screw, multi-screw or ring, the at least one aldehyde and/or at least one methylene donor product (D), is preferably fed downstream, in the proximity of the discharge portion of the apparatus and at temperatures preferably lower than 120° C.

Generally, the processing (I) of the components can last a total of 2 to 15 minutes, at temperatures ranging from 70 to 160° C., preferably from 130 to 160° C.

After one or more processing stages (I), the at least one vulcanising agent (F), preferably sulphur-based, is preferably incorporated into the non-vulcanisable elastomeric compound thus prepared, preferably together with the vulcanisation accelerants and retardants, to yield the vulcanisable elastomeric compound (production step II).

In the incorporation step (II) of the vulcanising agent and possibly of the vulcanisation accelerant and/or retardant, the temperature is generally kept lower than 140° C. and preferably lower than 120° C., more preferably between 80 and 105° C., in order to avoid any undesired pre-crosslinking phenomenon.

In a preferred embodiment, the process for the preparation of the vulcanisable compound of the invention comprises:

I) working and optionally heating to a temperature comprised between 130 and 160° C., in at least one suitable mixer:

at least one elastomeric polymer (A), at least one phenolic product (B), optionally already partially cross-linked, at least one oxidised carbon allotrope (C) selected from oxidised carbon nanotubes, oxidised graphite, oxidised graphene and oxidised carbon black and, optionally, at least one reinforcing filler (E), to yield a non-vulcanisable elastomeric compound (m1);

II) incorporating into the non-vulcanisable elastomeric compound (m1):

at least one vulcanisation agent (F), if present, at least one aldehyde and/or at least one methylene donor product (D), optionally, at least one vulcanisation accelerant and/or retardant agent, and working the compound, in the same or another suitable mixer, at a temperature not higher than 105° C., preferably between 80 and 105° C., to yield a vulcanisable elastomeric compound (m2); and III) discharging the vulcanisable elastomeric compound (m2).

In this preferred embodiment, the at least one phenolic product (B) and the at least one oxidised carbon allotrope (C) are preferably added in the processing step (I) to improve the dispersion thereof. Furthermore, the at least one aldehyde and/or at least one methylene donor product (D), if present, is preferably added in the step (II) of incorporation of the vulcanising agent (F) at controlled temperature to prevent undesired early reactions.

In one embodiment, the process for preparing the vulcanisable elastomeric compound of the invention comprises:

Ia) working at a temperature comprised between 130 and 160° C., in at least one suitable mixer:

the at least one elastomeric polymer (A), optionally in whole or in part, the at least one oxidised carbon allotrope (C) selected from oxidised carbon nanotubes, oxidised graphite, oxidised graphene and oxidised carbon black, optionally, the at least one reinforcing filler (E), and optionally, in whole or in part, the at least one phenolic product (B), to yield a non-vulcanisable elastomeric compound (m1a);

Ib) optionally incorporating into the non-vulcanisable elastomeric compound (m1a): optionally, in whole or in part, the at least one phenolic product (B), optionally already partially cross-linked, optionally, in whole or in part, the at least one oxidised carbon allotrope (C) selected from oxidised carbon nanotubes, oxidised graphite, oxidised graphene and oxidised carbon black, and working the compound, in the same or in another suitable mixer, at a temperature between 120 and 140° C., to yield a non-vulcanisable elastomeric compound (m1 b);

II) incorporating in the non-vulcanisable elastomeric compound (m1b) the at least one vulcanising agent (F), if present, the at least one aldehyde and/or at least one methylene donor product (D), optionally, the at least one vulcanisation accelerant and/or retardant, optionally, in whole or in part, the at least one phenolic product (B), optionally already partially cross-linked, optionally, in whole or in part, the at least one oxidised carbon allotrope (C) selected from oxidised carbon nanotubes, oxidised graphite, oxidised graphene and oxidised carbon black, provided that said at least one oxidised carbon allotrope (C) and said at least one phenolic product (B), possibly already partially cross-linked, are present in at least one of the steps I) or II), and working the compound, in the same or another suitable mixer, at a temperature of between 80 and 105° C., to yield the vulcanisable elastomeric compound (m2), and III) discharging the vulcanisable elastomeric compound (m2).

In a preferred embodiment, the process for preparing the vulcanisable elastomeric compound of the invention comprises:

Ia) working at a temperature comprised between 130 and 160° C., in at least one suitable mixer:

the at least one elastomeric polymer (A), optionally in whole or in part, the at least one oxidised carbon allotrope (C) selected from oxidised carbon nanotubes, oxidised graphite, oxidised graphene and oxidised carbon black, and optionally, the at least one reinforcing filler (E), to yield a non-vulcanisable elastomeric compound (m1a);

Ib) incorporating into the non-vulcanisable elastomeric compound (m1a): the at least one phenolic product (B), optionally already partially cross-linked, optionally, in whole or in part, the at least one oxidised carbon allotrope (C) selected from oxidised carbon nanotubes, oxidised graphite, oxidised graphene and oxidised carbon black, provided that said at least one oxidised carbon allotrope (C) is present in at least one of steps Ia) or Ib), and working the compound, in the same or in another suitable mixer, at a temperature between 120 and 140° C., to yield a non-vulcanisable elastomeric compound (m1b);

II) incorporating in the non-vulcanisable elastomeric compound (m1b) the at least one vulcanising agent (F), if present, the at least one aldehyde and/or at least one methylene donor product (D), optionally, the at least one vulcanisation accelerant and/or retardant, and working the compound, in the same or another suitable mixer, at a temperature of between 80 and 105° C., to yield the vulcanisable elastomeric compound (m2), and III) discharging the vulcanisable elastomeric compound (m2).

The vulcanisable compound according to the invention is characterised by a lower cross-linking time than a conventional compound, i.e. free of the oxidised carbon allotrope (C), as shown in FIGS. 5 and 6.

In particular, the vulcanisable elastomeric compound of the invention is characterised by a maximum torque time t-MH, measured at 170° C. and with all other conditions being equal, at least 20% lower, preferably at least 30%, more preferably at least 40% with respect to that of a vulcanisable elastomeric compound having the same composition but free of the oxidised carbon allotrope (C) selected from oxidised carbon nanotubes, oxidised graphite, oxidised graphene and oxidised carbon black, said t-MH being measured as indicated in the experimental part. Thereafter, the vulcanisable elastomeric compound is discharged to then be incorporated in one or more tyre components and subjected to vulcanisation, according to known techniques.

Advantageously, the oxidised carbon allotrope (C), and in particular the oxidised carbon black, incorporated in the elastomeric compounds cross-linked with resin, allows during the vulcanisation to accelerate the cross-linking reactions of the phenolic product with the aldehyde without depressing the sulphur cross-linking reaction and obtain, under normal vulcanisation times and conditions, or even more rapidly, vulcanised elastomeric compounds with stable mechanical properties, as shown in FIGS. 5 and 6, and reproducible from batch to batch.

A further aspect of the present invention is a component of a tyre comprising the vulcanisable compound of the invention (green component) or the vulcanised compound obtained by vulcanisation thereof (vulcanised component).

Preferably, the tyre component according to the invention consists of the vulcanisable compound according to the invention (green component) or of the vulcanised compound obtained by vulcanisation thereof (vulcanised component).

Preferably, the at least one tyre component according to the invention is selected from tread band, base-layer, anti-abrasive layer, sidewall, sidewall insert, mini-sidewall, under-liner, rubber layers, bead filler, flipper, chafer and sheet, more preferably it is selected from base-layer, anti-abrasive layer and bead filler.

A further aspect of the present invention is a tyre for vehicle wheels comprising at least one component of a tyre of the invention.

The tyre for vehicle wheels according to the invention comprises at least one tyre component consisting in whole or in part of the vulcanised elastomeric compound obtained by vulcanising the vulcanisable elastomeric compound of the invention.

Typically, the vulcanisation process of the tyre of the invention—which comprises the present elastomeric compound vulcanisable in one or more components—is carried out in conventional moulds at a temperature of between 140 and 190° C. and in a time of between 10 and 60 minutes.

Preferably, said vulcanisation process is carried out at a temperature lower than 180° C., more preferably lower than 175° C. and/or in a time lower than 20 minutes, more preferably lower than 15 minutes.

Advantageously, the presence of the oxidised carbon allotrope (C) in the compound allows completing the cross-linking reactions in shorter times, thus reducing the costs and duration of the industrial production process of the tyre.

An embodiment according to the present invention relates to a tyre for high performance vehicles (HP, SUV and UHP), wherein at least one component, preferably at least the bead filler, the base-layer, the anti-abrasive layer and/or the rubber layers, comprises the, or preferably consists of, the elastomeric compound according to the invention.

An embodiment according to the present invention relates to a tyre for heavy vehicles in which at least one component, preferably at least the bead filler, the base-layer and/or the anti-abrasive layer, comprises, or preferably consists of, the elastomeric compound according to the invention.

The tyre according to the invention may be a tyre for two or four-wheeled vehicles.

The tyre according to the invention may be for summer, winter use or for all seasons.

The tyre according to the present invention can be manufactured according to a process which comprises:

building components of a green tyre on at least one forming drum;

shaping, moulding and vulcanising the tyre;

wherein building at least one of the components of a green tyre comprises:

manufacturing at least one green component comprising, or preferably consisting of, the vulcanisable elastomeric compound of the invention.

DESCRIPTION OF THE DRAWINGS AND FIGURES

The present invention will now be described hereinafter with reference to the accompanying drawings, provided only for illustrative and, therefore, non-limiting purposes, in which.

DETAILED DESCRIPTION OF EMBODIMENTS OF THE INVENTION

Figure 1:
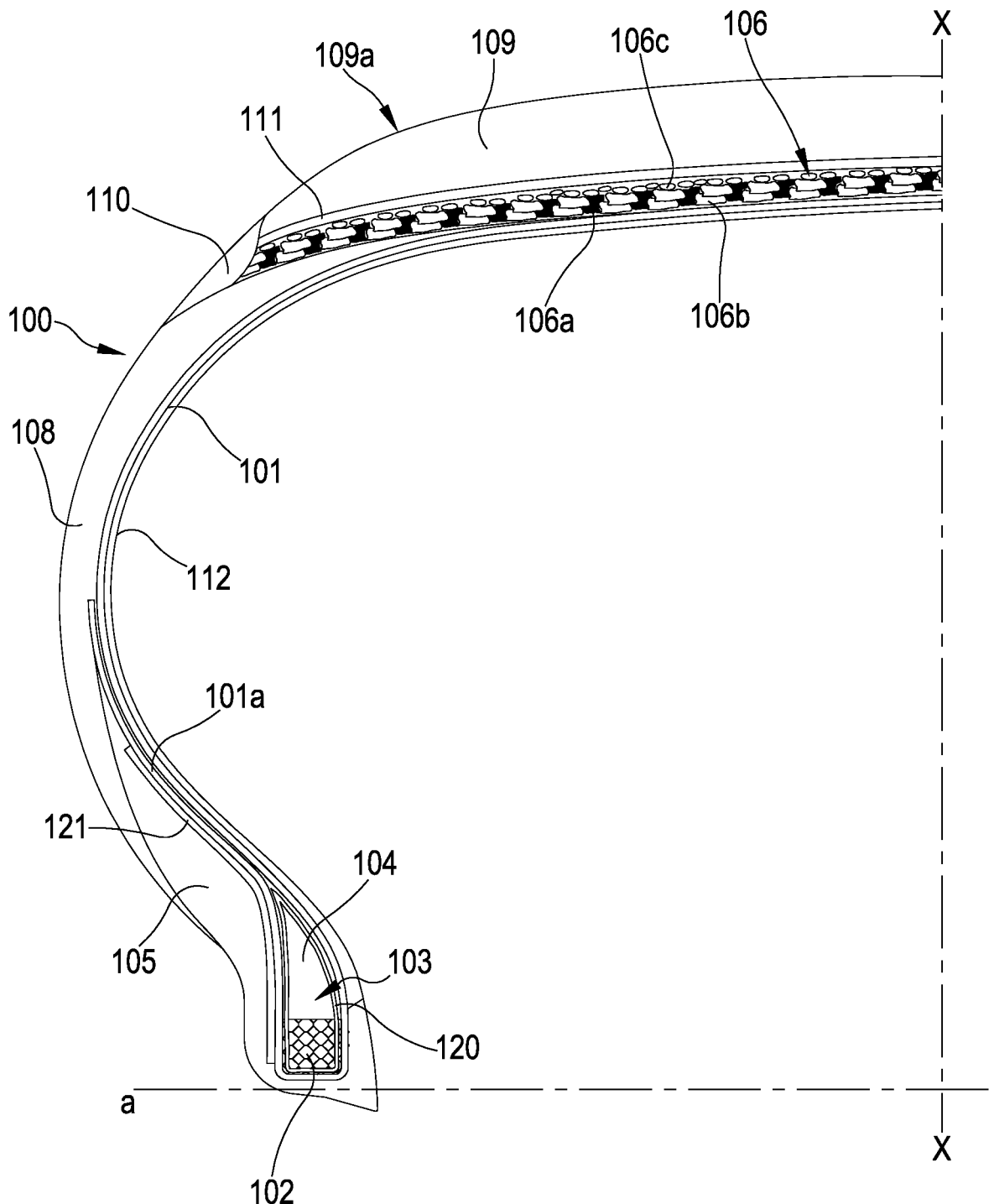
FIG. 1 shows a radial half-section of a tyre for vehicle wheels according to the invention.

FIG. 1 illustrates in a radial half-section a tyre for vehicle wheels, comprising in at least one of its components a vulcanised elastomeric compound prepared by vulcanising a vulcanisable elastomeric compound according to the invention, preferably in the bead filler, in the anti-abrasive layer and/or in the base-layer.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

Tyre 100 for four-wheeled vehicles comprises at least one carcass structure, comprising at least one carcass layer 101 having respectively opposite end flaps engaged with respective annular anchoring structures 102, referred to as bead cores, possibly associated to a bead filler 104, preferably made with the elastomeric compound of the invention.

The carcass layer 101 is optionally made with an elastomeric compound.

The tyre area comprising the bead core 102 and the filler 104 forms a bead structure 103 intended for anchoring the tyre onto a corresponding mounting rim, not shown.

The carcass structure is usually of radial type, i.e. the reinforcing elements of the at least one carcass layer 101 lie on planes comprising the rotational axis of the tyre and substantially perpendicular to the equatorial plane of the tyre. Said reinforcement elements generally consist of textile cords, such as rayon, nylon, polyester (for example polyethylene naphthalate, PEN). Each bead structure is associated to the carcass structure by folding back of the opposite lateral edges of the at least one carcass layer 101 around the annular anchoring structure 102 so as to form the so-called carcass flaps 101a as shown in FIG. 1.

In one embodiment, the coupling between the carcass structure and the bead structure can be provided by a second carcass layer (not shown in FIG. 1) applied in an axially outer position with respect to the first carcass layer.

An anti-abrasive layer 105 possibly made with the present elastomeric compound is arranged in an outer position of each bead structure 103.

The carcass structure is associated to a belt structure 106 comprising one or more belt layers 106a, 106b placed in radial superposition with respect to one another and with respect to the carcass layer, having typically textile and/or metallic reinforcement cords incorporated within a layer of vulcanised elastomeric compound.

Such reinforcement cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of elongated reinforcement elements, typically metallic or textile cords, oriented in a substantially circumferential direction, thus forming an angle of a few degrees (such as an angle of between about 0° and 6°) with respect to a direction parallel to the equatorial plane of the tyre, and coated with vulcanised elastomeric compound.

A tread band 109 of vulcanised elastomeric compound is applied in a position radially outer to the belt structure 106.

Moreover, respective sidewalls 108 of vulcanised elastomeric compound are applied in an axially outer position on the lateral surfaces of the carcass structure, each extending from one of the lateral edges of tread 109 at the respective bead structure 103.

In a radially outer position, the tread band 109 has a rolling surface 109a intended to come in contact with the ground. Circumferential grooves, which are connected by transverse notches (not shown in FIG. 1) so as to define a plurality of blocks of various shapes and sizes distributed over the rolling surface 109a, are generally made on this surface 109a, which for simplicity is represented smooth in FIG. 1.

A base-layer 111, preferably of vulcanised elastomeric compound according to the invention, may be arranged between the belt structure 106 and the tread band 109.

A strip consisting of elastomeric compound 110, commonly known as "mini-sidewall", of vulcanised elastomeric compound can optionally be provided in the connecting zone between sidewalls 108 and the tread band 109, this mini-sidewall generally being obtained by co-extrusion with the tread band 109 and allowing an improvement of the mechanical interaction between the tread band 109 and sidewalls 108. Preferably, the end portion of sidewall 108 directly covers the lateral edge of the tread band 109.

In the case of tubeless tyres, a rubber layer 112, generally known as "liner", which provides the necessary impermeability to the inflation air of the tyre, can also be provided in a radially inner position with respect to the carcass layer 101.

The rigidity of the tyre sidewall 108 can be improved by providing the bead structure 103 with a reinforcing layer 120 generally known as "flipper" or additional strip-like insert.

Flipper 120 is a reinforcing layer which is wound around the respective bead core 102 and the bead structure 104 so as to at least partially surround them, said reinforcing layer being arranged between the at least one carcass layer 101 and the bead structure 103. Usually, the flipper is in contact with said at least one carcass layer 101 and said bead structure 103.

Flipper 120 typically comprises a plurality of textile cords incorporated within a layer of vulcanised elastomeric compound.

The bead structure 103 of the tyre may comprise a further protective layer which is generally known by the term of "chafer" 121 or protective strip and which has the function of increasing the rigidity and integrity of the bead structure 103.

Chafer 121 usually comprises a plurality of cords incorporated within a rubber layer of vulcanised elastomeric compound. Such cords are generally made of textile materials (such as aramide or rayon) or metal materials (such as steel cords).

A layer or sheet of elastomeric compound can be arranged between the belt structure and the carcass structure. The layer can have a uniform thickness.

Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

The elastomeric compound according to the present invention can be advantageously incorporated in one or more of the components of the tyre selected from the belt structure, carcass structure, tread band, base-layer, sidewall, mini-sidewall, sidewall insert, bead filler, flipper, chafer, sheet and anti-abrasive layer, preferably it is incorporated in the bead filler, in the anti-abrasive layer and/or in the base-layer.

According to an embodiment not shown, the tyre may be a tyre for motorcycle wheels which is typically a tyre that has a straight section featuring a high tread camber.

According to an embodiment not shown, the tyre may be a tyre for heavy transport vehicle wheels, such as trucks, buses, trailers, vans, and in general for vehicles in which the tyre is subjected to a high load. Preferably, such a tyre is adapted to be mounted on wheel rims having a diameter equal to or greater than 17.5 inches for directional or trailer wheels.

Experimental Part

The description of some preparative examples according to the invention and comparative examples, given only for illustrative and non-limiting of the scope of the invention, is set out below. Hereinafter, the oxidised carbon allotrope (C) is also indicated by the term catalyst.

Analysis Methods

BET surface area: according to IS09277:2010

Elemental analysis: according to ASTM D5373 using the Thermo Flash EA 112 Series CHNS-O analyser.

DSC analysis: using the TA INSTRUMENTS Q20 instrument with a heating ramp of 10° C. a minute from 25° C. to 200° C. or preferably 220° C.

IR analysis: according to ASTM E1252-98 using the BRUKER Vertex70 spectrometer with DTGS detector, KBr beam splitter and a resolution of 2.0 cm$^{-1}$. The powder samples were dispersed in KBr tablets.

MDR rheometric analysis (according to ISO 6502): a rheometer Alpha Technologies type MDR2000 was used. The tests were carried out at 170° C. for 20 minutes at an oscillation frequency of 1.66 Hz (100 oscillations per minute) and an oscillation amplitude of ±0.5°, measuring the time necessary to achieve an increase of one and two rheometric units (ts1 and ts2) and the time necessary to achieve 30% (t30), 60% (t60) and 90% (t90), respectively, of the final torque value (Mf). The maximum torque value MH, the minimum torque value ML and the relative times t-MH and t-ML were also measured.

Example 1

Preparation of Oxidised Carbon Black

Example 1A (o-N110)

In a 2000 ml three-necked flask, thermostated with an ice bath, 120 ml of concentrated sulphuric acid, 2.5 g of sodium nitrate and 5 g of Cabot's N110 carbon black were added under magnetic stirring. After obtaining a uniform dispersion, 15 g of potassium permanganate were slowly added. The reaction mixture was kept at 35° C., under stirring, for 24 hours. Distilled water (700 ml) was introduced in small quantities, under stirring, and subsequently 5 ml of $H_2O_2$ (30% by weight aqueous solution) were added. The reaction crude was decanted into 7 l of distilled water, and centrifuged at 10000 rpm for 15 minutes with a Hermle Z323K centrifuge. After separation, the oxidised product was washed with 100 ml of a 5% aqueous solution of HCl and washed with 500 ml of distilled water. Finally, the product was dried in an oven at 60° C. for 12 hours. About 7 g of oxidised carbon black were obtained. The oxidised carbon black thus prepared (o-N110) was characterised by elemental analysis and IR analysis, as shown in Table 1 and FIG. 4.

The oxidised carbon black N110 examined under a microscope shows that it has substantially preserved the morphology of the starting N110 carbon black.

Example 1B (o-N234)

Starting from 5 g of Cabot's carbon black N234 and following the same procedure as in Example 1, 6.5 g of oxidised N234 carbon black were prepared.

Figure 4:
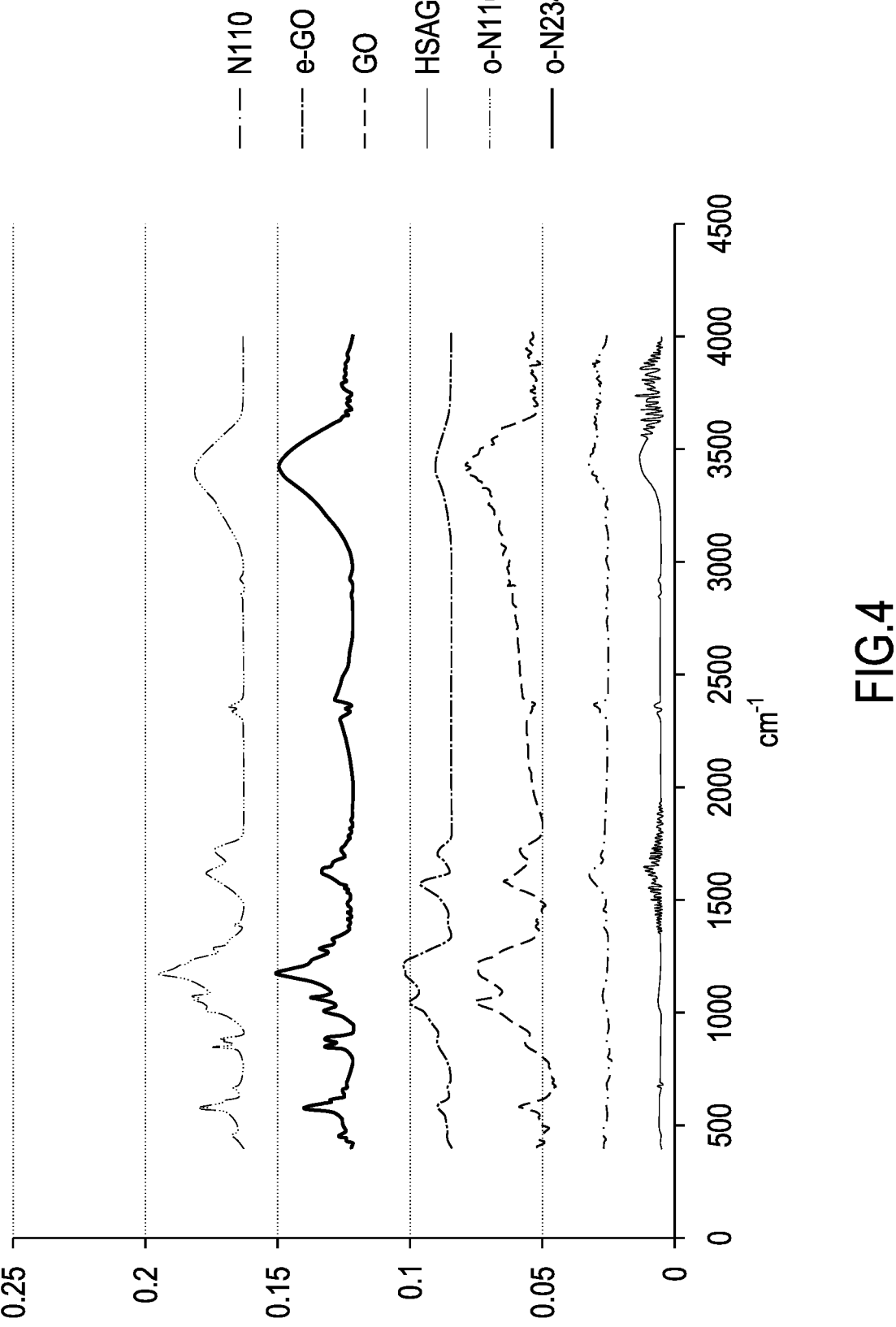
FIG. 4 shows the IR plot measured on oxidised (C) and non-oxidised carbon allotrope samples.

The oxidised carbon black N234 thus prepared was characterised by elemental analysis and IR analysis, as shown in Table 1 and FIG. 4.

Example 2

Example 2A

Preparation of Oxidised Graphene (GO)

Starting from 5 g of graphite with high surface area of Asbury (HSAG TC 307, surface area 330 m$^2$/g), and following the same procedure of Example 1, 6 g of oxidised graphene were prepared.

The oxidised graphene thus prepared was characterised by elemental analysis and IR analysis, as shown in Table 1 and FIG. 4.

Example 2B

Preparation of Oxidised Expanded Graphite (e-GO)

Starting from 5 g of expanded graphite and following the same procedure as in Example 1, 6 g of oxidised expanded graphite were prepared.

The oxidised expanded graphite thus prepared was characterised by elemental analysis and IR analysis, as shown in Table 1 and FIG. 4.

Example 3

Preparation of Oxidised Carbon Nanotubes (o-CNT)

75 ml of concentrated nitric acid were poured into 225 ml of sulphuric acid concentrated at 0° C. in a reaction flask. 300 mg of Nanocyl NC 7000 multiwall carbon nanotubes (surface area 250-300 m²/g) were added, under nitrogen and magnetic stirring. The reaction mixture was heated to 60° C. and stirred for 24 hours. The dark suspension thus obtained was diluted in 2-3 l of deionised water and centrifuged at 10000 rpm for 15 minutes. The isolated powder was washed with 100 ml of 5% by weight aqueous HCl and then with deionised water, finally dried in an oven at 60° C. for 12 hours. About 300 mg of oxidised carbon nanotubes were obtained.

The oxidised carbon nanotubes thus prepared were characterised by elemental analysis as shown in Table 1.

Elemental Analysis

The results of the elemental analysis carried out on samples of oxidised allotropes prepared according to Examples 1-3 are summarised in the following Table 1:

TABLE 1

| | | (% by weight) | | | | |
|---|---|---|---|---|---|---|
| Sample | Example | C | H | O | S | O/C |
| o-N234 | 1B | 60.3 | 1.7 | 35.0 | 2.8 | 0.58 |
| o-N110 | 1A | 50.3 | 2.3 | 41.7 | 5.4 | 0.83 |
| GO | 2A | 56.1 | 1.2 | 39.8 | 2.7 | 0.71 |
| e-GO | 2B | 59.4 | 0.6 | 37.1 | 2.6 | 0.62 |
| o-CNT | 3 | 79.9 | 0.3 | 19.5 | — | 0.24 |

As can be seen in Table 1, oxidised carbon black (examples 1A and 1B) is characterised by a higher sulphur content, compared to oxidised graphene (Examples 2A and 2B). Surprisingly, in contrast to what is taught in the literature, for example in the article Schonefield, *Industrial and engineering chemistry* 1934, page 571, vol. 27 no. 5. the oxidised carbon allotrope does not depress the vulcanisation reaction, as shown in Example 6.

IR Analysis

FIG. 4 shows the IR analysis plots of oxidised (o-N110, o-N234, e-GO, GO) and non-oxidised (N110, HSAG) carbon allotrope samples. As confirmation of the elemental analysis, the diagram shows the important presence of oxidised species in the oxidised carbon black samples (o-N110 and o-N234), which are instead of less intensity in the other oxidised allotropes and absent in the non-oxidised compounds (see in particular the signs in the area between 800 and 1700 cm$^{-1}$).

Example 4

Cross-Linking Tests According to the Type of Oxidised Carbon Allotrope

To evaluate the effect on the cross-linking kinetics of the various catalysts, with the same content, mixtures were prepared comprising 0.5 g of resorcin, 0.5 g of hexamethoxymethylmelamine (EMMM) and 20 mg (equal to 2% by weight of the mixture) respectively of the selected catalyst, of non-oxidised carbon black N110, of graphite with high surface area HSAG not oxidised and without any catalyst, as summarised in the following Table 2:

TABLE 2

| | Different catalysts at 2% by weight | | |
|---|---|---|---|
| Sample | Abbreviation | Test type | Notes |
| Ex. 4A | o-N110 | INV | With oxidised carbon black Ex. 1A |
| Ex. 4B | No catal. | COMP | Without catalyst and without allotrope |

TABLE 2-continued

| | Different catalysts at 2% by weight | | |
|---|---|---|---|
| Sample | Abbreviation | Test type | Notes |
| Ex. 4C | e-GO | INV | With oxidised expanded graphite Ex. 2B |
| Ex. 4D | o-N234 | INV | With oxidised carbon black Ex. 1B |
| Ex. 4E | o-CNT | INV | With oxidised carbon black Ex. 3 |
| Ex. 4F | HSAG | COMP | Without catalyst, with graphite large surface area |
| Ex. 4G | N110 | COMP | Without catalyst, with carbon black |

INV according to the invention;
COMP comparative

The mixtures were reacted in increasing temperature scan.

From the DSC plot, measured on the samples shown in Table 2, it was possible to observe the effect of the compound under examination on the kinetics of the cross-linking reaction, evaluating it in terms of variation of the peak temperature (delta T) of the catalysed reactions (Ex. 4A, 4C, 4D and 4E) with respect to the peak temperature of the non-catalysed reactions (Ex. 4B, 4F and 4G).

Figure 2:
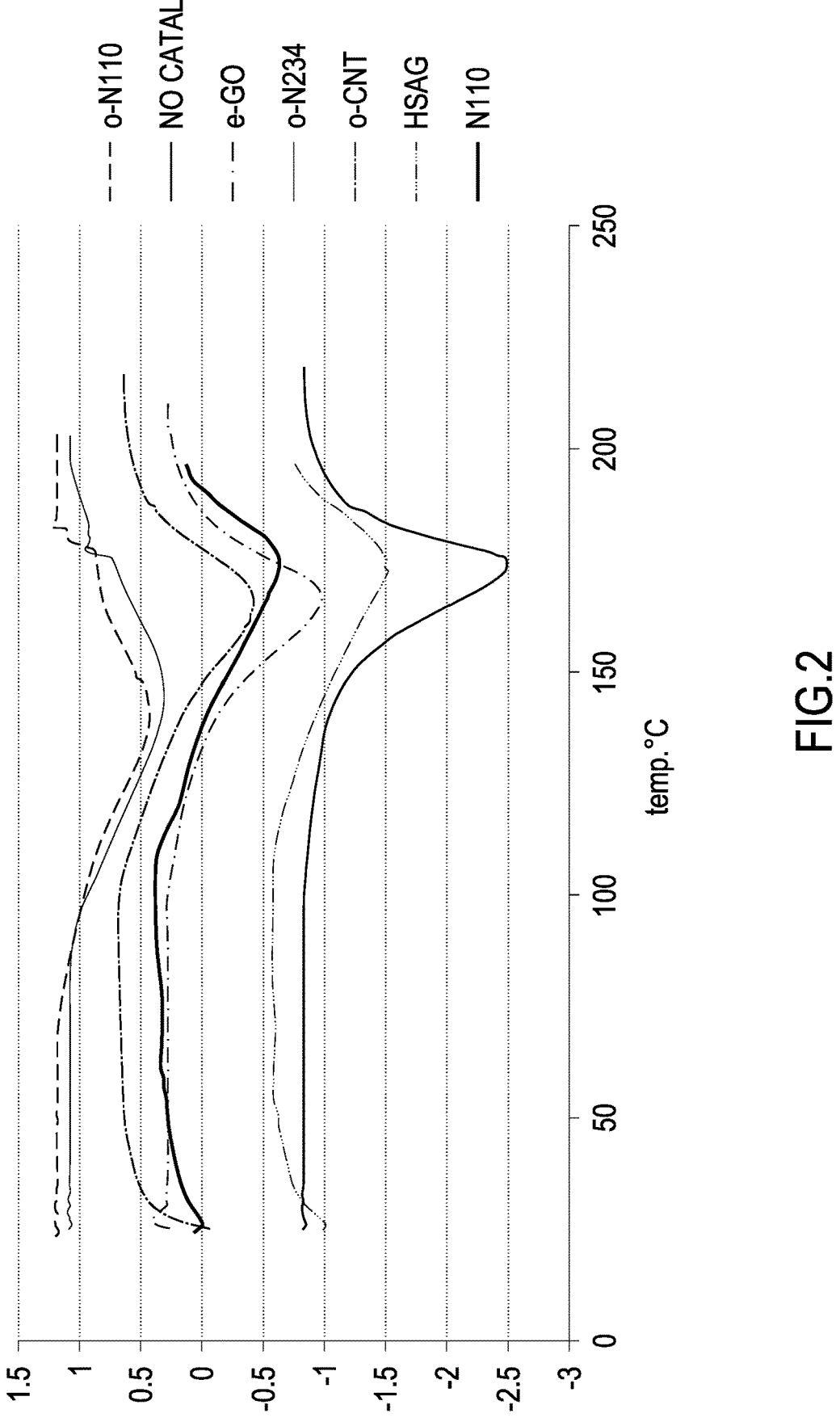
FIG. 2 shows the DSC plot (heat flow W/g with respect to temp. ° C.) of the cross-linking temperatures of phenolic resins as the oxidised allotrope (C) varies, at 2% by weight, or in its absence.

In particular, FIG. 2 shows the DSC plot of the reaction temperature of the samples of the mixtures of Examples 4A to 4G.

The graph shows that all oxidised allotropes exhibit catalytic activity on the cross-linking and that oxidised carbon black (0-N110 and o-N234) has a decidedly higher effect than oxidised expanded graphite (e-GO) and oxidised carbon nanotubes (o-CNT), in lowering the peak temperature value.

In fact, the peak temperature values are respectively about 150° C. for the oxidised carbon black (o-N110, Ex. 4A), 165° C. for oxidised expanded graphite (e-GO, Ex. 4C), for oxidised carbon nanotubes (o-CNT, Ex. 4E) and 170° C. for samples without catalyst (Ex. 4B, 4F and 4G).

From the trend of the curves it is also evident that the oxidised carbon black obtained from the carbon black having a higher surface area (sample o-N110, Ex. 4A, original surface area about 130 m²/g) is more effective in lowering the peak T compared to the sample o-N234 (Ex. 4D, original surface area about 110 m²/g), prepared with the same procedure but starting from a carbon black with a lower surface area.

Example 5

Cross-Linking Tests as the Quantity of Oxidised Carbon Black Varies (o-N110)

To evaluate the effect on the cross-linking kinetics of increasing quantities of catalyst, precisely from 0.2% to 2% by weight with respect to the weight of the mixture, mixtures containing 0.5 g of resorcin, 0.5 g of hexamethoxymethylmelamine (EMMM) and 2 mg, 10 mg or 20 mg respectively of oxidised carbon black of Ex. 1A (o-N110) were prepared. For comparison, similar mixtures comprising 2% of oxidised carbon black N110 or not comprising any catalyst were prepared, as shown in the following Table 3:

TABLE 3

Figure 3:
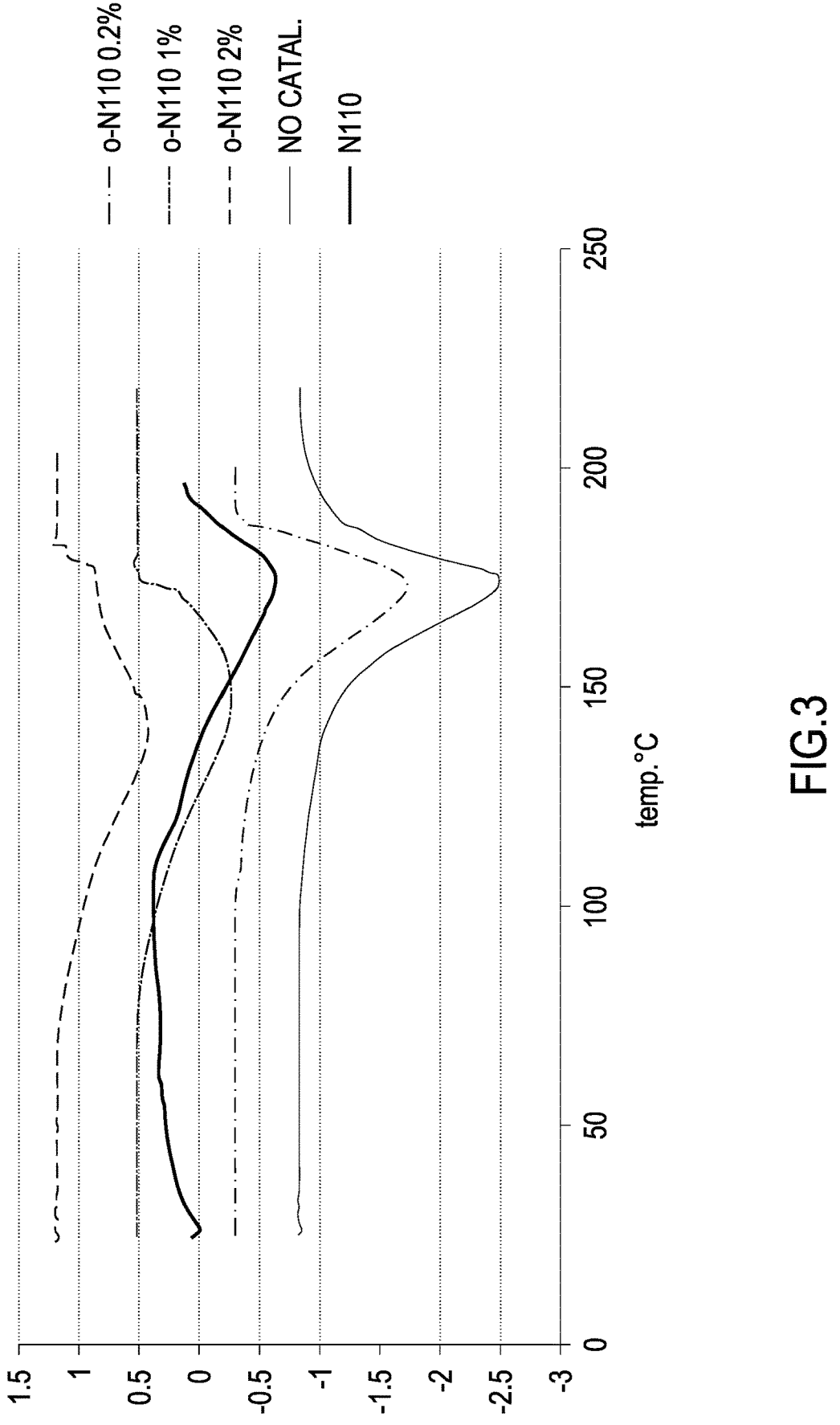
FIG. 3 shows the DSC plot (heat flow W/g with respect to temp. ° C.) of the cross-linking temperatures of phenolic resins as the quantity of oxidised carbon black varies.

| | Increasing catalyst o-N110 content | | |
|---|---|---|---|
| Mixture sample | Abbreviation in FIG. 3 | Test type | Notes |
| Ex. 5A | o-N110 0.2% | COMP | 0.2% catalyst Ex. 1A |
| Ex. 5B | o-N110 1% | INV | 1% catalyst Ex. 1A |

TABLE 3-continued

| | Increasing catalyst o-N110 content | | |
|---|---|---|---|
| Mixture sample | Abbreviation in FIG. 3 | Test type | Notes |
| Ex. 5C | o-N110 2% | INV | 2% catalyst Ex. 1A |
| Ex. 5D | No catal. | COMP | Without catalyst |
| Ex. 5E | N110 2% | COMP | Without catalyst, with 2% carbon black |

INV according to the invention;
COMP comparative

The mixtures were heated and reacted analogously to Example 4.

From the DSC plot shown in FIG. 3, the effect of increasing quantities of catalyst can be observed (Ex. 5A-5C), in terms of variation of the peak temperature (delta T), on the kinetics of the cross-linking reaction with respect to the samples without catalyst of Examples 5D and 5E.

The graph shows a marked effect on the cross-linking kinetics of the catalyst already at the concentration of 1% (sample of Ex. 5B) while for a concentration of 0.2% there is no macroscopic effect (Ex. 5A, delta T not evident). Furthermore, the absence of catalytic activity of carbon black per se (non-oxidized, N110, Ex. 5E) was confirmed.

Example 6

Preparation of Elastomeric Compounds for Tyres (for Bead Filler)

Elastomeric compounds for tyre bead filler were prepared as described herein.

The ingredients listed in Table 4 below were processed in three steps (Steps 1 to 3) using a Haake Rheolab mixer: in the first step, isoprenic rubber, non-oxidised carbon black, 6-PPD antioxidant, stearic acid and zinc oxide were introduced and the processing was continued for 6-7 minutes, until reaching 155° C.±5° C., when the composition was discharged. After 12-24 hours, in the second step, carried out using the same mixer, the novolac phenolic resin, the EMMM formaldehyde precursor were introduced and, respectively, no catalyst (Ex. 6A), oxidised graphene (Ex. 6B), oxidised carbon black (Ex. 60). The processing continued for about 3 minutes, until reaching 95° C.±5° C., when the compound was discharged. After 12-24 hours, in the third step, carried out using the same mixer, the TBBS accelerant, the sulphur vulcanising agent and the PVI retardant were introduced. The processing continued for about 2 minutes, until reaching 95° C.±5° C., when the compound was discharged.

TABLE 4

| | Ex. 6A COMP without catalyst | Ex. 6B INV oxidised graphene GO | Ex. 6C INV oxidised carbon black o-N110 |
|---|---|---|---|
| 1st step | | | |
| IR | 100 | 100 | 100 |
| Black N326 | 50 | 50 | 50 |
| 6PPD | 2 | 2 | 2 |
| Stearic acid | 2 | 2 | 2 |
| Zinc oxide | 3 | 3 | 3 |

TABLE 4-continued

| | Ex. 6A COMP without catalyst | Ex. 6B INV oxidised graphene GO | Ex. 6C INV oxidised carbon black o-N110 |
|---|---|---|---|
| 2nd step | | | |
| EMMM | 5.1 | 5.1 | 5.1 |
| GO Ex. 2A | | 4 | |
| o-N110 Ex. 1A | — | — | 4 |
| Novolacca resin | 10 | 10 | 10 |
| 3rd step | | | |
| TBBS | 1.5 | 1.5 | 1.5 |
| Vulcanising agent | 8 | 8 | 8 |
| PVI | 0.3 | 0.3 | 0.3 | wherein
INV according to the invention; COMP comparative
IR is a high cis-1,4-polyisoprene rubber (SKI-3 from Nižnekamsk),
N326 is carbon black produced by Cabot,
6-PPD is N-1,3-dimethylbutyl-N-phenyl-p-phenylenedi-amine Santoflex produced by Flexsys,
Stearic acid is produced by Sogis,
Zinc oxide is produced by Zincol oxides,
EMMM is hexamethoxymethylmelamine at 65% by weight on an inert support, Cyrez 964 PC, by Cytec,
TBBS is N-terbutyl 2-benzothiazil sulphenamide, Vulkacit NZIEGC produced by Lanxess,
PVI is cyclohexyl thiophthalimide Santogard PVI, Flexsys,
Vulcanising agent is Sulphur Redball Superfine, International Sulphur Inc.,
Novolacca resin is ALNOVOL PN 320 from Allnex,
o-N110 and GO are respectively oxidised carbon black and oxidised graphene, prepared as described in Examples 1A and 2A respectively.

The compounds thus prepared were subjected to measurement of the rheological properties (vulcanisation at 170° C. for 20 minutes) as shown in the following Table 5:

TABLE 5

| | u.m. | Ex. 6A COMP | Ex. 6B INV | Ex. 6C INV |
|---|---|---|---|---|
| ML | dNm | 2.54 | 2.68 | 2.96 |
| MH | dNm | 33.39 | 29.46 | 33.14 |
| ts1 | min | 0.58 | 0.62 | 0.55 |
| ts2 | min | 0.69 | 0.73 | 0.67 |
| t30 | min | 1.16 | 1.11 | 1.20 |
| t60 | min | 2.80 | 2.36 | 2.32 |
| t90 | min | 10.54 | 7.89 | 5.06 |
| S' at t60 | dNm | 21.04 | 18.73 | 21.06 |
| S' at t90 | dNm | 30.32 | 26.79 | 30.13 |
| S" at t90 | dNm | 3.83 | 2.58 | 3.39 |
| t-ML | min | 0.31 | 0.32 | 0.28 |
| t-MH | min | 19.87 | 19.27 | 10.52 | wherein
u.m. unit of measurement;
ML and MH are minimum and maximum values of the compound torque measured in the MDR rheometric analysis;
ts1 and ts2 are the times, expressed in minutes from the beginning of the test, that the compound takes to reach the torque value ML+1 or ML+2, respectively;
t60 and t90 are the times at which the vulcanisation degree of the compound is equal to 60% and 90%, setting 0 the torque value ML and 100 the torque value MH;

S' at t60 and t90 expresses the value of the component in phase with respect to the deformation imposed by the torque at 60 and 90 minutes of vulcanisation;

S" at t90 expresses the value of the quadrature component with respect to the deformation imposed by the torque at 90 minutes of vulcanisation;

t-ML and t-MH are the minimum and maximum torque times, that is, the times required for the green compound to reach the minimum and maximum Mooney viscosity values at a given vulcanisation temperature.

Figure 5:
FIG. 5 is a rheogram showing the pattern over time of the pair S' of reference elastomeric compounds (Ex. 6A) and of the invention (Ex. 6B and 6C) during and after vulcanisation.

As can be seen from the values of the rheological properties shown in Table 5 and from the pattern of the curves of the S'/time rheogram of FIG. 5, the oxidised carbon black (Ex. 6C) was found to be very active in the cross-linking reaction of the resins in the compound. In fact, in the samples according to the invention (Ex. 6C) S' quickly reached the plateau value without further growth while the reference (Ex. 6A, without catalyst) showed the characteristic pattern of the marching modulus, which is observed when the cross-linking speed of the resin is not high enough to allow the reaction to be completed within normal vulcanisation times. In particular, it was noted that for the reference (Ex. 6A, without catalyst) the completion time of the cross-linking reactions at 170° C. was even greater than 20 minutes.

The sample of Ex. 6B (oxidised graphene catalyst), although reaching the maximum torque value in a time that is only slightly less than the reference (Ex. 6A), however, had a much flattened curve (FIG. 5) i.e. a less pronounced marching modulus. This preliminary data indicated that oxidised graphene could also be effective but that it probably needed higher quantities to provide better results.

Instead in the sample of Ex. 6C with oxidised carbon black according to the invention, the completion time of the cross-linking reactions at 170° C. was decidedly shorter and stood around 10 minutes, i.e. about half the time required for the reference sample (Ex. 6A), Particularly interesting was the effect on the terminal part of the curve, with a decreasing trend, indicative of exceeding the optimal time of completion of the vulcanisation.

Figure 6:
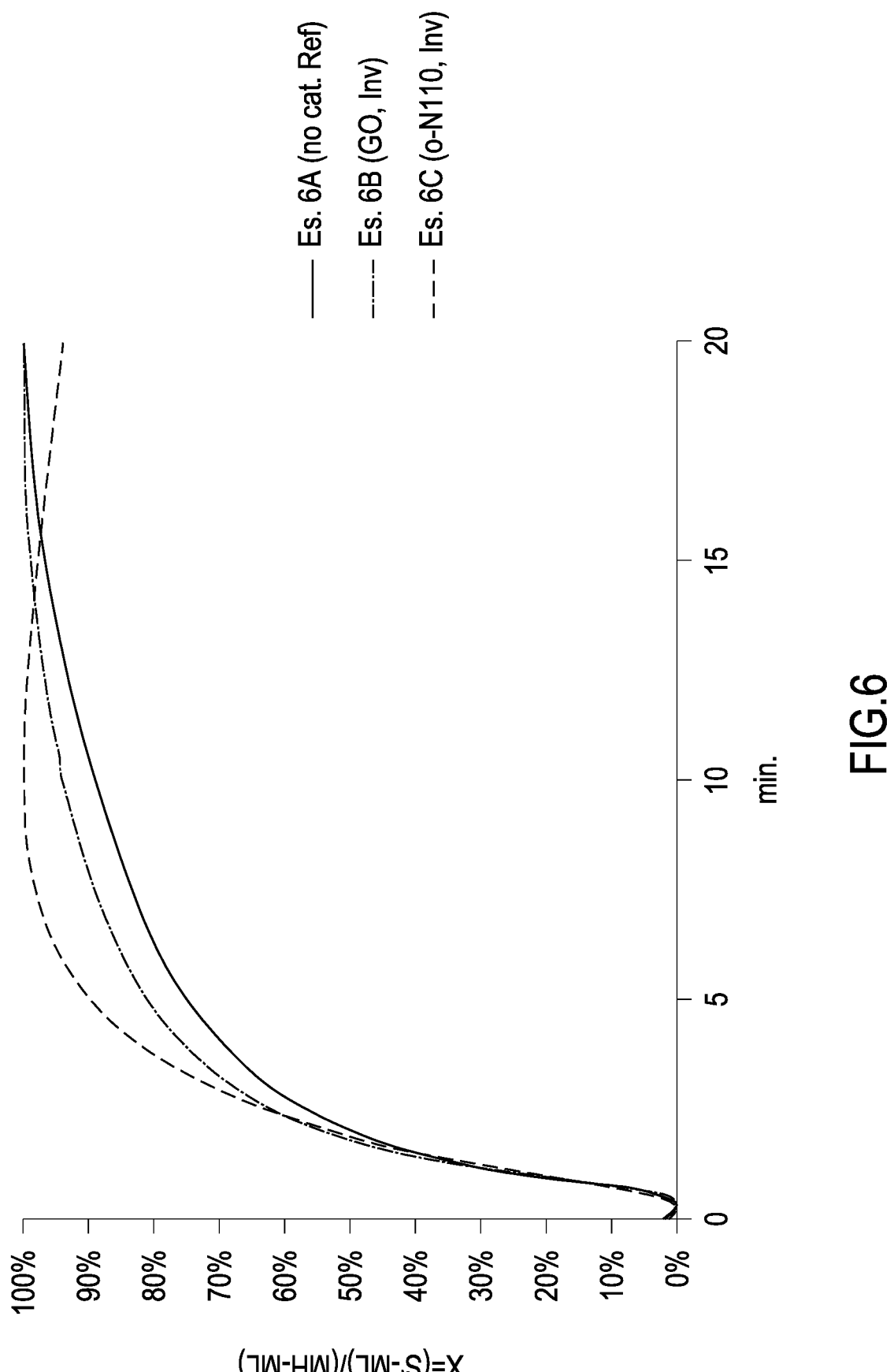
FIG. 6 is a rheogram showing the pattern over time of the degree of vulcanisation X [X=(S'−ML)/(MH−ML)] of reference elastomeric compounds (Ex. 6A) and of the invention (Ex. 6B and 6C) during and after vulcanisation.

From the rheogram of FIG. 6 it was clearly seen that the time required to reach 100% of the cross-linking of the compound according to the invention (Ex. 6C), comprising the oxidised carbon black (C), was much lower than that of the reference compound (Ex. 6A), without catalyst, while the reduction effect was less marked for the compound comprising oxidised graphene (Ex. 6B), in line with the DSC study of FIG. 2.

Finally, it could be seen in the initial part of the curve of the diagrams in FIGS. 5 and 6 and from the values of ts2 and t30 in Table 5 that, in the case of samples comprising oxidised carbon black (Ex. 6C) or oxidised graphene (Ex. 6B) according to the invention, the sulphur vulcanisation was not excessively accelerated, thus preventing possible scalding problems.

The invention claimed is:

1. An elastomeric composition for tyres, comprising:
100 phr of at least one diene elastomeric polymer (A),
from 0.5 to 50 phr of at least one phenolic product (B), optionally partially cross-linked,
from 2 to 6 phr of oxidised carbon black (C),
from 0 to 50 phr of at least one aldehyde, at least one methylene donor product, or both (D),
from 30 to 70 phr of carbon black (E), and
from 0.1 to 15 phr of at least one vulcanising agent (F), wherein the oxidised carbon black (C) has an oxygen content higher than 30% by weight, measured by elemental analysis.

2. The composition as claimed in claim 1, wherein the oxidised carbon black (C) is characterised by one or more of the following parameters:
an oxygen/carbon (O/C) ratio higher than 0.50;
an oxygen content higher than 34%, measured by elemental analysis; and
a surface area (BET measured according to ISO 9277: 2010) of at least 20 $m^2/g$.

3. The composition as claimed in claim 1, wherein:
the at least one diene elastomeric polymer (A) is chosen from cis-1,4-polyisoprene, 3,4-polyisoprene, polybutadiene, isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers and mixtures thereof;
the at least one phenolic product (B) is chosen from phenol; ethylphenols; isopropylphenols; butylphenols; alkylphenols; halogenophenols; substituted monophenols; cresols; bicyclic monophenols; polyphenols; 4-chlororesorcin; 2-nitroresorcin; 4-bromoresorcin; pyrogallol; catechol; alkylcatechol; hydroquinone; alkylhydroquinone; fluoroglucine; bisphenol A; bisphenol F; bisphenol S; dihydroxynaphthalene; novolacs; and resoles;
the at least one aldehyde (D), if present, is chosen from formaldehyde, acetaldehyde, propionaldehyde, chloral, furfural, glyoxal, n-butylaldehyde, caproaldehyde, allylaldehyde, benzaldehyde, crotonaldehyde, acrolein, phenylacetaldehyde, o-tolylaldehyde, and salicylaldehyde;
the at least one methylene donor product (D), if present, is chosen from paraformaldehyde, trioxane, tetraoxymethylene, hexamethylenetetramine (HMTA), and hexamethoxymethylmelamine (HMMM);
the at least one vulcanising agent (F) is chosen from sulphur, sulphur-containing molecules, and mixtures thereof.

4. The composition as claimed in claim 1, wherein the composition comprises
from 0.5 to 12 phr of at least one vulcanising agent (F).

5. The composition as claimed in claim 1, wherein a weight ratio between the at least one phenolic product (B), optionally partially cross-linked, and the aldehyde, the at least one methylene donor product, or both (D) ranges from 0.1:1 and 60:1.

6. The composition as claimed in claim 1, further comprising one or more additives chosen from compatibilising agents, vulcanisation activators, vulcanisation accelerants, vulcanisation retardants, antioxidants, waxes, and plasticisers.

7. The composition as claimed in claim 1, wherein the composition comprises:
100 phr of at least one diene elastomeric polymer (A),
from 5 to 25 phr of a novolac (B),
from 2 to 6 phr of oxidised carbon black (C),
from 3 to 8 phr of a methylene donor product (D),
from 30 to 70 phr of carbon black (E), and
from 6 to 10 phr of sulphur (F).

8. The composition as claimed in claim 1, wherein the oxidised carbon black (C) is characterised with a surface area of at least 40 $m^2/g$.

9. The composition as claimed in claim 1, wherein the oxidised carbon black (C) is prepared from a carbon black with a surface area of at least 80 m²/g.

10. The composition as claimed in claim 1, wherein the oxidised carbon black (C) is prepared from a carbon black with a surface area of at least 105 m²/g.

11. A vulcanisable elastomeric compound for tyres prepared by mixing and optionally heating the components of the elastomeric composition for tyres according to claim 1.

12. The vulcanisable elastomeric compound as claimed in claim 11, wherein the compound is characterised by a maximum torque time t-MH, measured at 170° C. according to ISO 6502, lower than at least 20%, with respect to the maximum torque time t-MH of a vulcanisable elastomeric compound having the same composition but without the oxidised carbon black (C).

13. A process for preparing the vulcanisable elastomeric compound as claimed in claim 11, the process which comprises:

I) working, and optionally heating to a temperature not higher than 160° C., in at least one suitable mixer:

at least one elastomeric polymer (A), optionally at least one phenolic product (B), optionally partially cross-linked, optionally, oxidised carbon black (C), wherein the oxidised carbon black (C) has an oxygen content higher than 30% by weight, measured by elemental analysis and is present in an amount in a range of 2 to 6 phr in the elastomeric compound, and carbon black (E), to yield a non-vulcanisable elastomeric compound (m1);

II) incorporating into the non-vulcanisable elastomeric compound (m1):

at least one vulcanisation agent (F) and, if present, at least one aldehyde, at least one methylene donor product, or both (D), optionally, at least one vulcanisation accelerant, retardant agent, or both, optionally at least one phenolic product (B), optionally partially cross-linked, optionally, oxidised carbon black (C), wherein the oxidised carbon black (C) and the at least one phenolic product (B), possibly already partially cross-linked, are present in at least one of the steps I) or II), and working the compound, in the at least one suitable mixer, at a temperature not higher than 120° C., to yield a vulcanisable elastomeric compound (m2), and III) discharging the vulcanisable elastomeric compound (m2).

14. The process as claimed in claim 13, wherein the process comprises:

I) working, and optionally heating to a temperature ranging from 130° C. to 160° C., in the at least one suitable mixer:

at least one elastomeric polymer (A), at least one phenolic product (B), optionally partially cross-linked, oxidised carbon black (C) and carbon black (E), to yield a non-vulcanisable elastomeric compound (m1);

II) incorporating into the non-vulcanisable elastomeric compound (m1):

at least one vulcanisation agent (F), if present, at least one aldehyde, at least one methylene donor product, or both (D), optionally, at least one vulcanisation accelerant, retardant agent, or both, and working the compound, in the at least one suitable mixer, at a temperature not higher than 105° C., to yield a vulcanisable elastomeric compound (m2); and III) discharging the vulcanisable elastomeric compound (m2).

15. A tyre component comprising the vulcanisable compound as claimed in claim 11 or the vulcanised compound obtained by vulcanisation thereof.

16. The tyre component as claimed in claim 15, wherein the tyre component is chosen from tread band, base-layer, anti-abrasive layer, sidewall, sidewall insert, mini-sidewall, under-liner, rubber layers, bead filler, flipper, chafer and sheet, preferably selected from base-layer, anti-abrasive layer, and bead filler.

17. A tyre for vehicle wheels comprising at least one tyre component as claimed in claim 15.

18. A process for preparing vulcanisable elastomeric compound for tyres comprising:

cross-linking at least one phenolic product (B), optionally partially cross-linked, in the presence of oxidised carbon black, as a cross-linking accelerant, wherein the oxidised carbon black (C) has an oxygen content higher than 30% by weight, measured by elemental analysis and is present in an amount in a range of 2 to 6 phr in the elastomeric compound.

19. The process of claim 18, wherein the step of cross-linking further comprises at least an aldehyde, at least one methylene donor product, or both (D), in the vulcanisable elastomeric compound for tyres.

20. An elastomeric composition for tyres, comprising:

100 phr of at least one diene elastomeric polymer (A), from 1 to 30 phr of at least one phenolic product (B), optionally partially cross-linked, from 2 to 6 phr of oxidised carbon black (C), from 1 to 8 phr of at least one aldehyde, at least one methylene donor product, or both (D), from 30 to 70 phr of carbon black (E), and from 0.1 to 15 phr of at least one vulcanising agent (F), wherein the oxidised carbon black (C) has an oxygen content higher than 30% by weight, measured by elemental analysis.

\* \* \* \* \*